United States Patent
Meier et al.

(10) Patent No.: US 10,366,538 B2
(45) Date of Patent: *Jul. 30, 2019

(54) METHOD AND DEVICE FOR ILLUSTRATING A VIRTUAL OBJECT IN A REAL ENVIRONMENT

(71) Applicant: Apple Inc., Cupertino, CA (US)

(72) Inventors: Peter Meier, Munich (DE); Stefan Holzer, Moosburg (DE)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/887,280

(22) Filed: Oct. 19, 2015

(65) Prior Publication Data

US 2017/0109929 A1 Apr. 20, 2017

Related U.S. Application Data

(63) Continuation of application No. 12/680,117, filed as application No. PCT/EP2008/008055 on Sep. 23, 2008, now Pat. No. 9,165,405.

(30) Foreign Application Priority Data

Sep. 25, 2007 (DE) .......................... 10 2007 045 835

(51) Int. Cl.
*G06T 7/73* (2017.01)
*G06T 15/04* (2011.01)
(Continued)

(52) U.S. Cl.
CPC .............. *G06T 19/006* (2013.01); *G06T 7/74* (2017.01); *G06T 15/04* (2013.01); *G06T 15/20* (2013.01);
(Continued)

(58) Field of Classification Search
None
See application file for complete search history.

(56) References Cited

U.S. PATENT DOCUMENTS

| 5,625,765 A | 4/1997 | Ellenby |
| 6,037,936 A | 3/2000 | Ellenby |

(Continued)

FOREIGN PATENT DOCUMENTS

| DE | 10128015 A1 | 10/2001 |
| DE | 20203367 | 6/2003 |

(Continued)

OTHER PUBLICATIONS

Frank Nielsen and Richard Nock. 2005. ClickRemoval: interactive pinpoint image object removal. In Proceedings of the 13th annual ACM international conference on Multimedia (MULTIMEDIA '05). ACM, New York, NY, USA, 315-318 (Year: 2005).*

(Continued)

*Primary Examiner* — Motilewa Good Johnson
(74) *Attorney, Agent, or Firm* — Blank Rome LLP

(57) ABSTRACT

The invention relates to a method for representing a virtual object in a real environment, having the following steps: generating a two-dimensional image of a real environment by means of a recording device, ascertaining a position of the recording device relative to at least one component of the real environment, segmenting at least one area of the real environment unmarked in reality in the two-dimensional image for identifying at least one segment of the real environment in distinction to a remaining part of the real environment while supplying corresponding segmentation data, and merging the virtual object with the two-dimensional image of the real environment with consideration of the segmentation data such that at least one part of the segment of the real environment is removed from the image of the real environment. The invention permits any colli- (Continued)

sions of virtual objects with real objects that occur upon merging with a real environment to be represented in a way largely close to reality.

20 Claims, 13 Drawing Sheets

(51) Int. Cl.
    *G06T 15/20*     (2011.01)
    *G06T 19/00*     (2011.01)

(52) U.S. Cl.
    CPC ............... *G06T 2207/30244* (2013.01); *G06T 2210/04* (2013.01); *G06T 2215/12* (2013.01); *G06T 2215/16* (2013.01)

(56) References Cited

U.S. PATENT DOCUMENTS

| | | | | |
|---|---|---|---|---|
| 6,166,744 A * | 12/2000 | Jaszlics | ............... | G06T 17/00 345/421 |
| 6,337,925 B1 * | 1/2002 | Cohen | ............... | G06T 7/194 382/164 |
| 6,891,966 B2 * | 5/2005 | Chen | ............... | G06K 9/20 382/145 |
| 6,937,255 B2 | 8/2005 | Fukuda | | |
| 6,954,498 B1 * | 10/2005 | Lipton | ............... | G06K 9/00771 348/E5.058 |
| 7,003,136 B1 * | 2/2006 | Harville | ............... | G06K 9/00201 348/169 |
| 7,023,536 B2 | 4/2006 | Zhang | | |
| 7,038,846 B2 | 5/2006 | Mandella | | |
| 7,043,695 B2 | 5/2006 | Elber | | |
| 7,088,440 B2 | 8/2006 | Buermann | | |
| 7,110,100 B2 | 9/2006 | Buermann | | |
| 7,113,270 B2 | 9/2006 | Buermann | | |
| 7,119,819 B1 | 10/2006 | Robertson | | |
| 7,161,664 B2 | 1/2007 | Buermann | | |
| 7,193,633 B1 * | 3/2007 | Reinhardt | ............... | G06T 17/10 345/420 |
| 7,203,356 B2 * | 4/2007 | Gokturk | ............... | G06K 9/00228 375/E7.083 |
| 7,203,384 B2 | 4/2007 | Carl | | |
| 7,212,687 B2 | 5/2007 | Ohshima | | |
| 7,268,956 B2 | 9/2007 | Mandella | | |
| 7,372,977 B2 * | 5/2008 | Fujimura | ............... | G06K 9/00369 382/103 |
| 7,474,809 B2 | 1/2009 | Carl | | |
| 7,512,262 B2 * | 3/2009 | Criminisi | ............... | G06K 9/00241 382/106 |
| 7,523,411 B2 | 4/2009 | Carlin | | |
| 7,542,051 B2 | 6/2009 | Matsui | | |
| 7,720,282 B2 * | 5/2010 | Blake | ............... | G06K 9/00234 345/619 |
| 7,728,852 B2 * | 6/2010 | Suzuki | ............... | G06F 3/012 345/629 |
| 7,729,515 B2 | 6/2010 | Mandella | | |
| 7,777,762 B2 | 8/2010 | Katano | | |
| 7,817,161 B2 * | 10/2010 | Lefebvre | ............... | G06T 11/001 345/582 |
| 7,826,641 B2 | 11/2010 | Mandella | | |
| 7,920,144 B2 * | 4/2011 | Vogt | ............... | G06T 13/20 345/475 |
| 7,961,909 B2 | 6/2011 | Mandella | | |
| 8,072,470 B2 * | 12/2011 | Marks | ............... | A63F 13/10 345/473 |
| 8,339,418 B1 * | 12/2012 | Nesmith | ............... | 345/633 |
| 8,508,546 B2 * | 8/2013 | Wilensky | ............... | G06K 9/4652 345/592 |
| 9,253,417 B2 * | 2/2016 | Lundgren | ............... | H04H 60/04 |
| 9,390,560 B2 | 7/2016 | Meier | | |
| 2002/0010655 A1 | 1/2002 | Kjallstrom | | |
| 2004/0046864 A1 * | 3/2004 | Gross | ............... | G06T 17/005 348/52 |
| 2004/0105573 A1 | 6/2004 | Neumann | | |
| 2004/0119662 A1 | 6/2004 | Dempski | | |
| 2005/0069223 A1 | 3/2005 | Tanimura | | |
| 2005/0081161 A1 | 4/2005 | MacInnes | | |
| 2005/0168437 A1 | 8/2005 | Carl | | |
| 2007/0003154 A1 | 1/2007 | Sun | | |
| 2007/0035561 A1 * | 2/2007 | Bachelder | ............. | G06T 19/003 345/633 |
| 2007/0110298 A1 * | 5/2007 | Graepel | ............. | G06K 9/00355 382/154 |
| 2007/0146360 A1 * | 6/2007 | Clatworthy | ............. | G06T 15/20 345/419 |
| 2007/0146391 A1 * | 6/2007 | Pentenrieder | ......... | G06T 19/006 345/633 |
| 2007/0236510 A1 | 10/2007 | Kakuta | | |
| 2007/0242899 A1 | 10/2007 | Satoh | | |
| 2008/0071559 A1 * | 3/2008 | Arrasvuori | ............. | G06Q 30/06 705/26.1 |
| 2008/0266323 A1 | 10/2008 | Biocca | | |
| 2009/0066690 A1 * | 3/2009 | Harrison | ............... | G06T 19/006 345/419 |
| 2009/0096808 A1 * | 4/2009 | Winn | ...................... | G06T 11/60 345/594 |
| 2009/0297061 A1 * | 12/2009 | Mareachen | ............. | G06T 11/00 382/285 |
| 2010/0110068 A1 * | 5/2010 | Yamauchi | ............. | H04N 13/349 345/419 |
| 2010/0287511 A1 | 11/2010 | Meier | | |
| 2011/0227915 A1 | 9/2011 | Mandella | | |
| 2012/0038549 A1 | 2/2012 | Mandella | | |
| 2013/0194418 A1 | 8/2013 | Gonzalez-Banos | | |

FOREIGN PATENT DOCUMENTS

| | | |
|---|---|---|
| DE | 102004046144 | 3/2006 |
| DE | 10301849 | 3/2007 |
| DE | 102005060980 A1 | 6/2007 |
| EP | 1701233 | 9/2006 |
| JP | 05061962 | 3/1993 |
| JP | 2000036061 | 2/2000 |
| JP | 2000048081 | 2/2000 |
| JP | 03129495 | 1/2001 |
| JP | 2002334119 | 11/2002 |
| JP | 2003256876 | 9/2003 |
| JP | 2003264740 | 9/2003 |
| JP | 2003296759 A | 10/2003 |
| JP | 2004046326 | 2/2004 |
| JP | 2004234253 | 8/2004 |
| JP | 2004310686 | 11/2004 |
| JP | 2005157610 | 6/2005 |
| JP | 2006072805 | 3/2006 |
| JP | 2006352473 A | 12/2006 |
| JP | 2007048271 A | 2/2007 |
| WO | 0196829 | 12/2001 |

OTHER PUBLICATIONS

P. Fortin and P. Hebert, "Handling Occlusions in Real-time Augmented Reality : Dealing with Movable Real and Virtual Objects," The 3rd Canadian Conference on Computer and Robot Vision (CRV'06), Quebec, Canada, 2006, pp. 54-54.doi: 10.1109/CRV.2006.38 (Year: 2006).*

Breen, D. et al., "Interactive occlusion and automatic object placement for augmented reality," Computer Graphics Forum, vol. 15, No. 3, Blackwell Science Ltd., Sep. 1996.

Breen et al., "Interactive Occlusion and Collision of Real and Virtual Objects in Augmented Reality," 1995, European Computer-Industry Research Centre.

Cakmakci et al., "A Compact Optical See-Through Head-Worn Display with Occlusion Support," Third IEEE and ACM International Symposium on Mixed and Augmented Reality, Nov. 2, 2004, pp. 16-25.

Criminisi et al., "Region Filling and Object Removal by Exemplar-Based Image Inpainting," Sep. 2004, IEEE Transactions on Image Processing, vol. 13, No. 9.

(56) References Cited

OTHER PUBLICATIONS

Fischer J., Huhle B., Schilling A., "Using Time-of Flight Range Data for Occlusion Handling in Augmented Reality," IPT-EGVE Symposium (2007).
Fortin P., et al., "Handling Occlusions in Real-Time Augmented Reality: Dealing with Movable Real and Virtual Objects," Proceedings of the 3rd Canadian Conference on Computer and Robot Vision (CRV*06), Jun. 7, 2006.
Jacobs et al., "Automatic generation of consistent shadows for Augmented Reality," 2005, GI '05 Proceedings of Graphics.
Japanese office action for JP2012-155127 dated Sep. 18, 2013.
Japanese office action for JP2014-168046 dated Jun. 24, 2015.
Kiem Ching Ong, Hung Chuan The, Tiow Seng Ten, "Resolving occlusion in image sequence made easy," The Visual Computer (1998) 14, pp. 153-165, Springer Verlag 1998.
Kwatra et al., "Graphcut textures: image and video synthesis using graph cuts," Jul. 2003, ACM Transactions on Graphics, vol. 22, pp. 277-286.
Lepetit et al., "Handling Occlusion in Augmented Reality Systems: A Semi-Automatic Method," IEEE and ACM International Symposium on Augmented Reality, Oct. 5, 2000, pp. 137-146.
Lindner M., Kolb, A., Hartmann, K., "Data-Fusion of PMD-Based Distance Information and High-Resolution RGB-Images," Signals, Circuits and Systems, 2007, vol. 1, pp. 1-4.
Liu C., Pan L., Guo Y., Wang J., Chen W., Peng Q., "Image Inpainting Based on Large Displacement View Images," Journal of Software, 2006, p. 138-147.
Siltanen, Sanni, "Texture Generation over the Marker Area," IEEE/ACM International Symposium on Mixed and Augmented Reality, 2006, ISMAR 2006, p. 253-254.
Tang F., Ying Y., Wang J., Peng Q., "A Novel Texture Synthesis Based Algorithm for Object Removal in Photographs," Advances in Computer Science—Asian 2004, 2005, p. 248-258.
Zokai et al., "Multiview Paraperspective Projection Model for Diminished Reality," The Second IEEE and ACM International Symposium on Mixed and Augmented Reality, Oct. 7, 2003, pp. 217-226.

\* cited by examiner

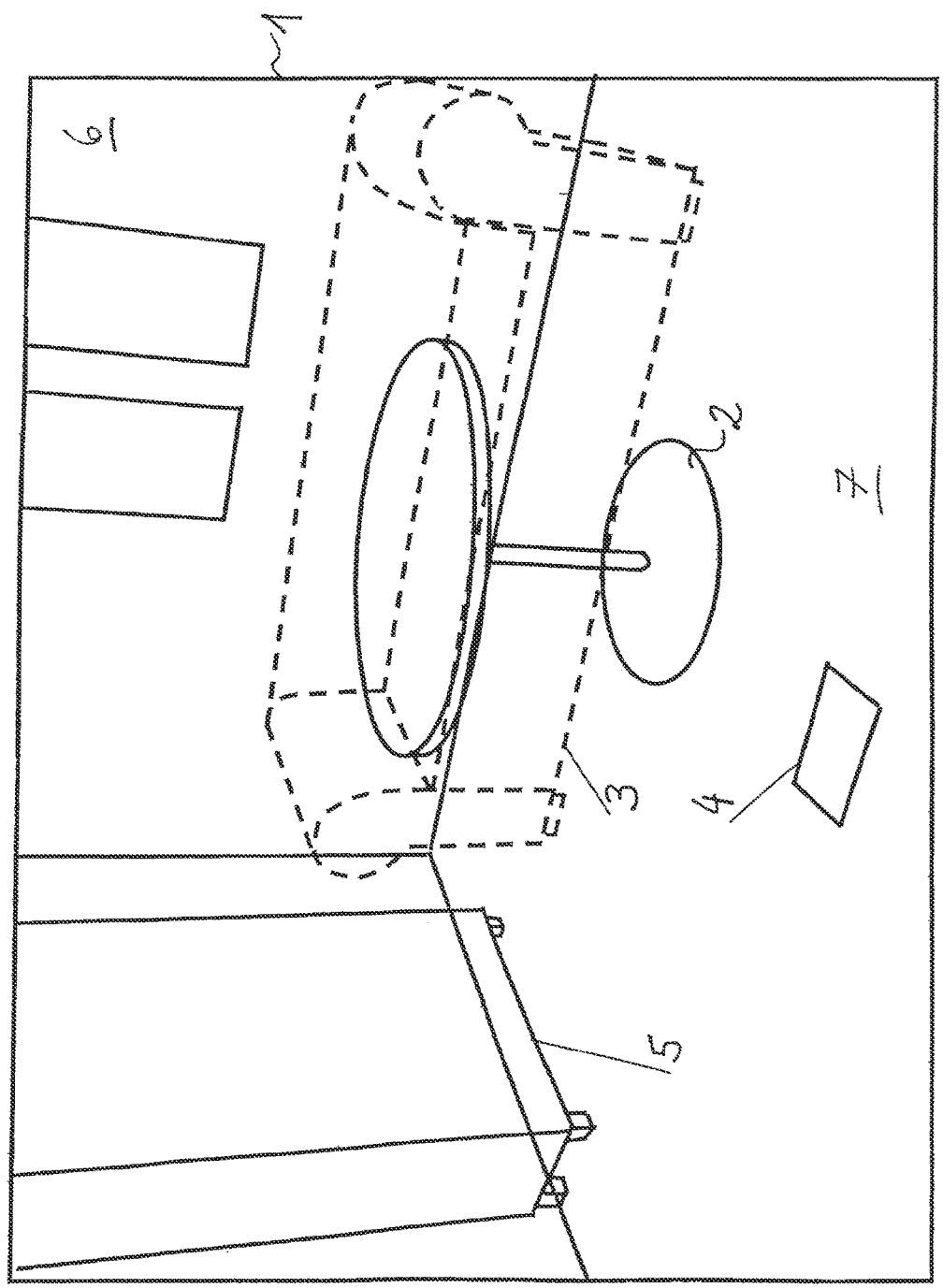

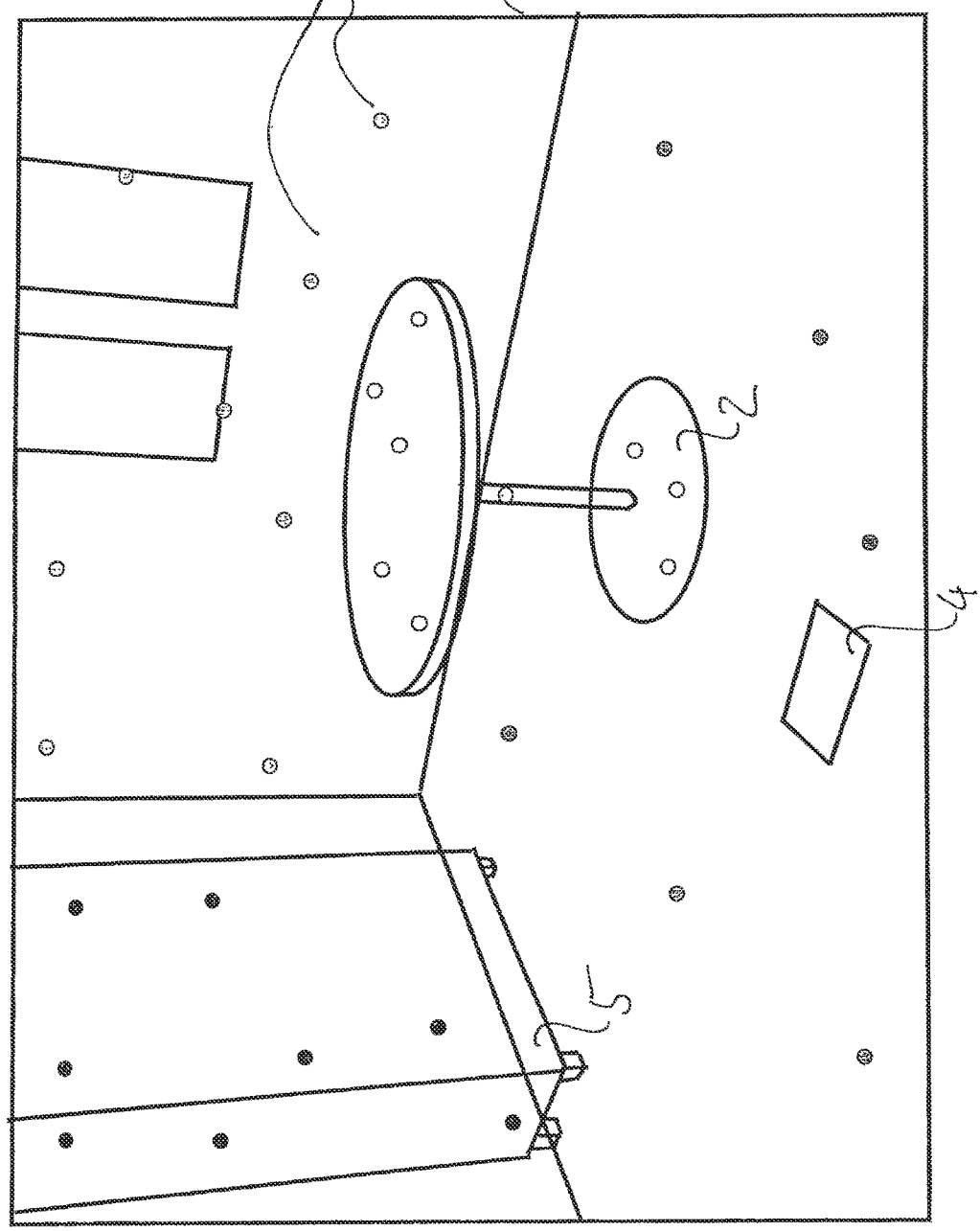

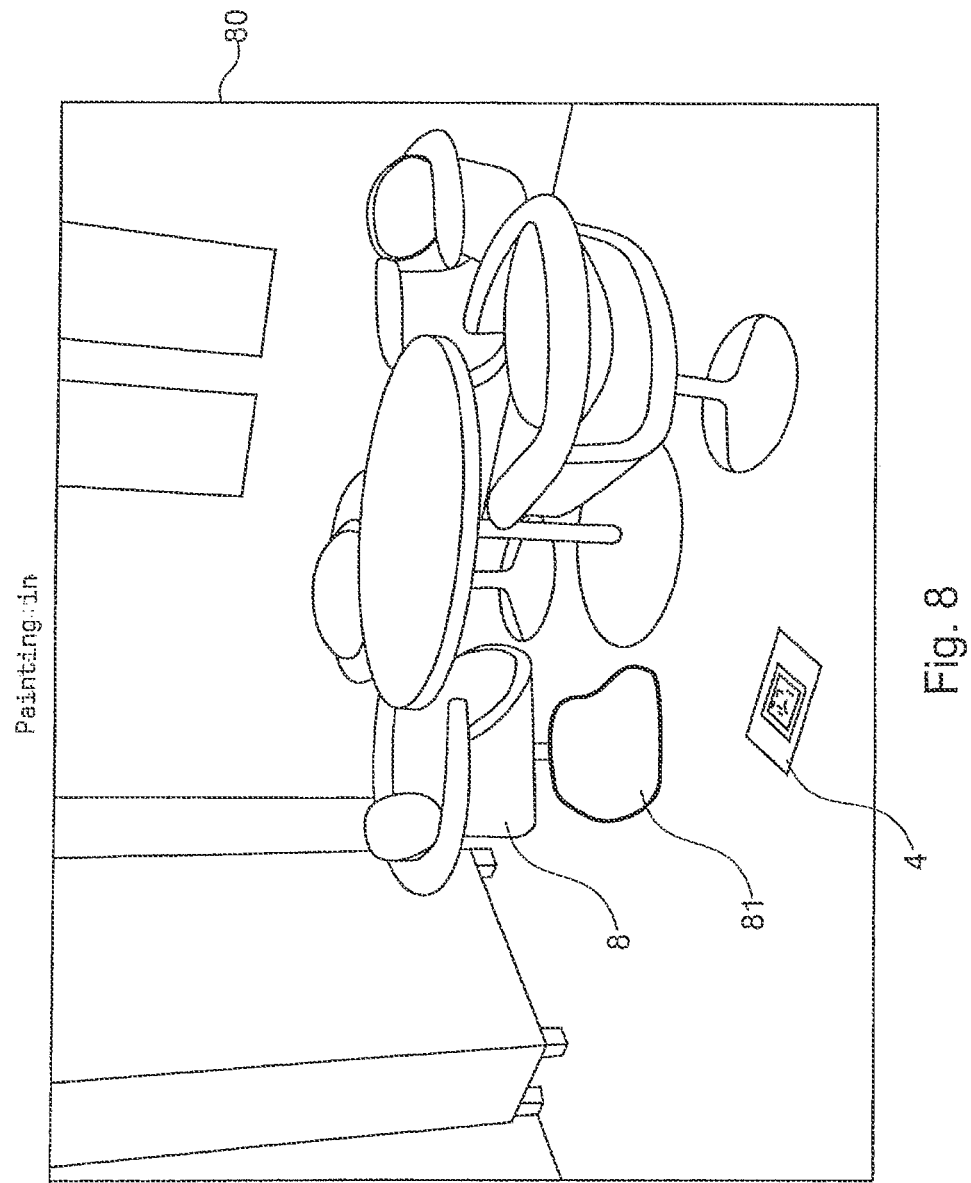

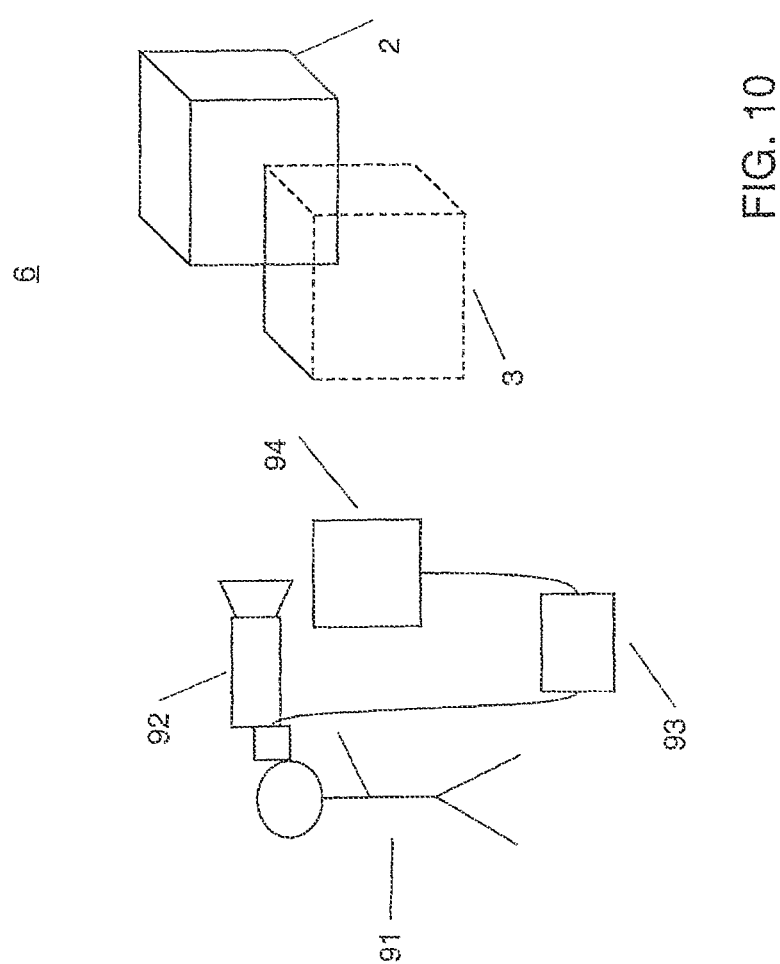

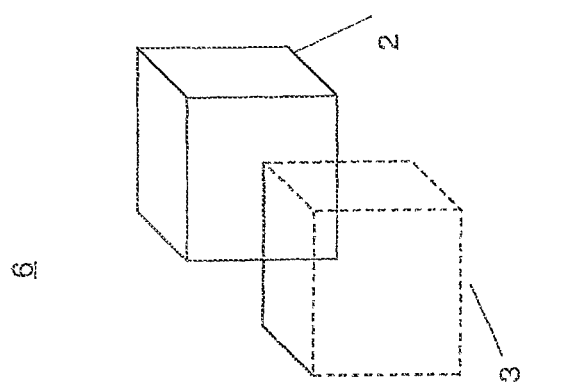
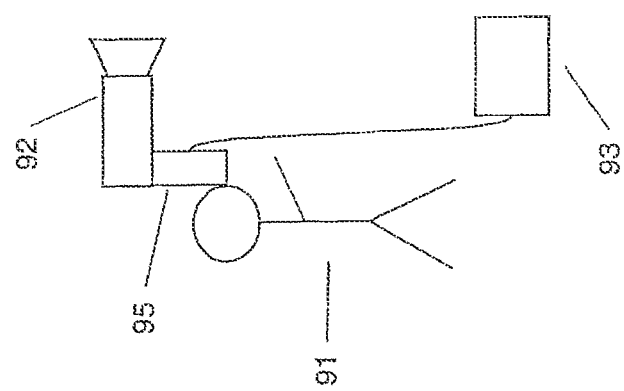
FIG. 11

METHOD AND DEVICE FOR ILLUSTRATING A VIRTUAL OBJECT IN A REAL ENVIRONMENT

This application is entitled to the benefit of, and incorporates by reference essential subject matter disclosed in PCT Application No. PCT/EP2008/008055 filed on Sep. 23, 2008, which claims priority to German Patent Application No. 10 2007 045 845.7 filed Sep. 25, 2007.

BACKGROUND OF THE INVENTION

1. Technical Field

This invention relates to a method and apparatus for representing a virtual object in a real environment, in particular for merging the virtual object with an image of the real environment generated by a recording device.

2. Background Information

Such a method and apparatus are known in the prior art in particular in connection with so-called augmented reality systems. The latter permit the merging of computer-generated, virtual information with visual impressions or an image of the real environment. The insertion of the virtual information or objects can be effected in contextual fashion and in correct perspective, i.e. adapted and derived from the real environment being viewed. The virtual information employed can be basically any type of data such as objects, texts, images, etc. The real environment can be captured for example with a camera worn by the user. It is further known in particular to superimpose virtual models with reality for the purpose of checking the correctness of models or of reality produced according to a specification. Ranges of application of this technology are for example factory planning (DE 101 28 015 A1, DE 10 2004 046 144 A1) or automobile design (DE 202 03 367).

Furthermore, there are known from the prior art augmented reality systems for product presentation, as described e.g. in DE 103 01 849 B4. Herein there is described a method for representing a furnishing in a usage environment wherein a reference geometry is employed in the usage environment, the usage environment including the reference geometry is optically recorded by means of a stationary image recording device and the recording is stored in the form of recording image data, the position of the stationary image recording device with regard to the reference geometry is ascertained by image processing, and the image data of the virtually existing furnishing and the recording image data are joined together in correct perspective. The usage environment is then displayed to the user with the furnishing inserted in correct perspective. Advantages of the described system and method consist in particular in the joint perception of products in the usage environment. This leads to an intuitive assessment of the suitability of various products for a purpose of use. Furthermore, it is very easy to ascertain the geometrical suitability of a product at a place of use. Further, it is possible to determine the suitability of a product for a purpose of use, e.g. the suitability of a furniture piece, without previous delivery. Any collisions of the products with other objects can be quickly discovered by the user.

With regard to any collisions of the products with other objects there is often the problem that concealments cannot be represented in a way close to reality or faithful to reality. For example, in a collision case a virtual object cannot be concealed by a real object when this is required by a perspectively correct representation, but the virtual object would always be represented in the foreground and thus cover the real object. This leads to a rather unrealistic representation. Likewise, it can be desirable to remove certain real objects ("spurious objects"), e.g. when an existing furnishing is to be replaced by a new furnishing.

From DE 10 2005 011 126 A1 there is known a method which contains a model of reality wherein mutual concealments of the real environment and of the virtual object are provided in dependence on a position of the virtual object with regard to the real environment. The research project ARIS has also dealt with augmented reality. The topic of concealment (known as "occlusion") was already addressed therein: The user "scans" his environment. There is effected a consideration of the lighting conditions and a reproduction of the room (not described how) and an application for occlusion and object collision. A camera calibration is effected via vanishing points and the user is able to remove objects from the image of his environment.

Lepetit, V., Berger, M.-O., Handling occlusion in augmented reality systems: a semi-automatic method. In Augmented Reality, 2000. (ISAR 2000). Proceedings. IEEE and ACM International Symposium on Augmented Reality. Publication date: 2000, pages 137-146, Meeting date: Oct. 5, 2000-Oct. 6, 2000, ISBN: 0-7695-0846-4: In this publication the occluding object must be initialized by hand. Automatic acceptance of the information is only possible for small changes in the camera pose. Initialization by hand is also required by the following method: Resolving occlusion in image sequence made easy: Kiem Ching Ong, Hung Chum Teh, Tiow Seng Tan. In: The Visual Computer (1998) 14:153±165, Springer-Verlag 1998.

Handling Occlusions in Real-time Augmented Reality: Dealing with Movable Real and Virtual Objects, Pierre-Alexandre Fortin and Patrick Hebert. In Proceedings of the 3rd Canadian Conference on Computer and Robot Vision (CRV'06) 0-7695-2542-3/06 ©2006 IEEE. In this publication the occlusion problem is solved within very controlled and restricted basic conditions. Two approaches are compared: One approach works with a 3D initialization geometry which is tied to optical markings with which the spurious object must be labeled. The initialization geometries are then combined with a background subtraction algorithm. However, the background must be uniform or the visualization camera must not move. For automatic, realistic representation of any objects, this method is unsuitable. The second approach uses depth information from a stereo camera system and employs it directly for occlusion. However, due to noise and the well-known problems of using depth cameras, this approach is qualitatively dissatisfactory.

With regard to the removal of spurious objects it is likewise known in the prior art to use segments. The main focus of the following publication is an approach for generating texture information. However, the identification of the replaced segment is not generally applicable to spurious objects, but rather only the marking is removed therein which is easy to recognize for image processing algorithms and is employed for generating the camera pose. (Siltanen, Sanni: "Texture Generation over the Marker Area" in IEEE/ACM International Symposium on Mixed and Augmented Reality, 2006. ISMAR 2006. Publication date: October 2006, pages: 253-254, Place: Santa Barbara, Calif., USA, ISBN: 1-4244-0651-X)

An object of the invention is to specify a method and apparatus for representing a virtual object in a real environment with which any occurring collisions of virtual objects with real objects upon merging with a real environment can be represented in a way largely close to reality.

SUMMARY OF THE INVENTION

Examples of application of the invention comprise for example augmented reality applications such as in vehicles, in interior design planning, factory planning, prototype construction or test construction in product development. There is made possible in particular a close-to-reality merging of virtual object with the real environment also upon collisions arising in the course of merging.

Possible applications of the system and method according to the invention include in particular applications of augmented reality technology in the areas of sales, service and maintenance, applications in production, and applications in a mobile setting in general. Furthermore, it is very easy to ascertain the geometrical suitability of a product at a place of use.

In particular, one aspect of the invention describes a method for representing a virtual object in a real environment, having the following steps: generating one or more two-dimensional images of a real environment by means of a recording device, ascertaining a position of the recording device relative to at least one component of the real environment, generating 3D image information or spatial information, segmenting at least one area of the real environment unmarked in reality in the two-dimensional image for identifying at least one segment of the real environment in distinction to a remaining part of the real environment while supplying corresponding segmentation data, and merging the virtual object with the two-dimensional image of the real environment with consideration of the segmentation data such that at least one part of the segment of the real environment is removed from the image of the real environment.

One basic idea of the invention thus consists in combining sensor indications (e.g. of radar- or camera-based 3D reconstruction data) with 2D segmentation methods for removing spurious objects.

The invention solves the problem of removing spurious objects by the use of image segments. For room planning, all single steps can basically be performed manually or using an automatic, computer-aided method (so-called "wizard"). A wizard attempts to extract information automatically and the user can confirm results, or improve them by stating further information. For example, a wizard can identify spurious objects and mark their contours. The user can then optionally improve the contours.

The invention can not only be employed for room planning, however, but also for other augmented reality (AR) applications, for example an AR navigation system in a vehicle.

In particular a camera as the recording device and a display as the indicating device form a so-called video see-through system wherein there is located before the user's eye a videoscreen on which real and virtual visual impressions are merged. In the case of so-called optical see-through, merging is effected by a so-called optical mixer—a semitransparent display apparatus (for instance, semitransparent data goggles worn on the user's head) before the user's eye wherein the real world can be seen via the transparency of the apparatus, and the superimposition of virtual information is effected via projection onto the display apparatus.

One possible use of the invention is the change of a real room, for example in order to place virtual furnishings in said room for which free space is required. An advantage of augmented reality technology is the viewing of objects in their real environment, for example the viewing of a wooden table on an existing wooden floor or in front of an existing cabinet. Hence, it is expedient to work not purely virtually, but to remove spurious real furniture pieces from the scene or to change their position in the room without having to clear them aside physically.

There can be selected for this purpose at least one area of the real environment from which information is obtained for concealing the part of the real environment to be removed. For example, a concealment of the part of the real environment to be removed is effected on the basis of texture information in the surroundings of the part to be removed. It is also possible to take into consideration three-dimensional depth information for selection of suitable information sources, in particular in the form of an existing floor plane or an existing wall plane, for the choice of the employed texture information.

In one embodiment of the invention, the real environment including a reference geometry is optically recorded and the position of the recording device is ascertained employing the reference geometry. As the reference geometry there can be employed a marker by which the spatial position of the recording device in relation to the recorded reality can be ascertained.

An advantageous embodiment of the invention consists in that the real environment is optically recorded by the recording device from different positions of the recording device, and a respective recording is stored in a corresponding recording image data set, wherein the segment data obtained in one of the recording image data sets can be employed at least partly in the other ones of the recording image data sets to represent the real environment with the inserted virtual object in respective views corresponding to the recording image data sets. It is possible here to support both the segment identification and the segment selection over a plurality of recordings.

Segment identification designates the subdivision of image areas on which different components of reality are imaged. For example, a possible segment would be the image area in which a cabinet or a vehicle driving ahead is imaged. Segment selection is carried out by the user and informs the system for example of which segment is to be "erased".

In one embodiment of the invention, the virtual object is a furnishing or a part of a furnishing and the real environment is a usage environment. For example, the method is implemented in an augmented reality system of a computer-aided shopping platform, in particular for furnishings. This may be e.g. the shopping platform of a furniture store.

In another embodiment of the invention, the virtual object is a vehicle-based object or vehicle-based display and the real environment is a vehicle environment. For example, the method is implemented in an augmented reality system of a vehicle.

An inventive apparatus for representing a virtual object in a real environment has the following features: a recording device for generating a two-dimensional image of the real environment, furthermore a data processing system which determines the position of the recording device relative to at least one component of the recorded real environment. In the data processing system there is implemented a method which is suitable for segmenting at least one area of the real environment unmarked in reality in the two-dimensional image for identifying at least one segment of the real environment in distinction to a remaining part of the real environment while supplying corresponding segmentation data. An indicating device connected to the data processing system serves to display the image of the real environment generated by the recording device merged with the virtual object with consideration of the segmentation data such that at least one part of the segment of the real environment is removed from the image of the real environment.

The recording device can be, or contain, a camera or a radar device or a time-of-flight camera or a stereo camera. It is also possible to combine a 2D camera and a time-of-flight camera. In particular a camera as the recording device and a display as the indicating device form a so-called video see-through system wherein there is located before the user's eye a screen on which real and virtual visual impressions are merged.

The invention also relates to a computer program product which has software code portions which are suitable in an inventive method for ascertaining the position of the recording device, ideally for generating 3D image data from one or more images, for segmenting at least one area of the real environment, and for merging the virtual object with the real environment with consideration of the segmentation data, when they are stored in a system for representing a virtual object in a real environment.

Further embodiments and developments of the invention are stated in the subclaims.

BRIEF DESCRIPTION OF THE DRAWINGS

The invention will hereinafter be explained more closely with reference to the figures shown in the drawing.

FIG. 1 shows a schematic representation or view of a real environment which is to be merged with a virtual object, whereby a part of the virtual object is located behind a real object, thus partly colliding therewith, FIG. 3 shows a schematic representation of a step for three-dimensional segmentation initialization on the basis of image features, FIGS. 5 to 8 show, by an exemplary scenery, other embodiments for manual or semi-manual segmentation of a real space, FIG. 7 shows the use of a 3D space feature as initialization information for a 2D segmentation method.

FIGS. 10, 11 show schematic, basic views of components of an inventive system.

DETAILED DESCRIPTION OF THE INVENTION

Figure 2A:
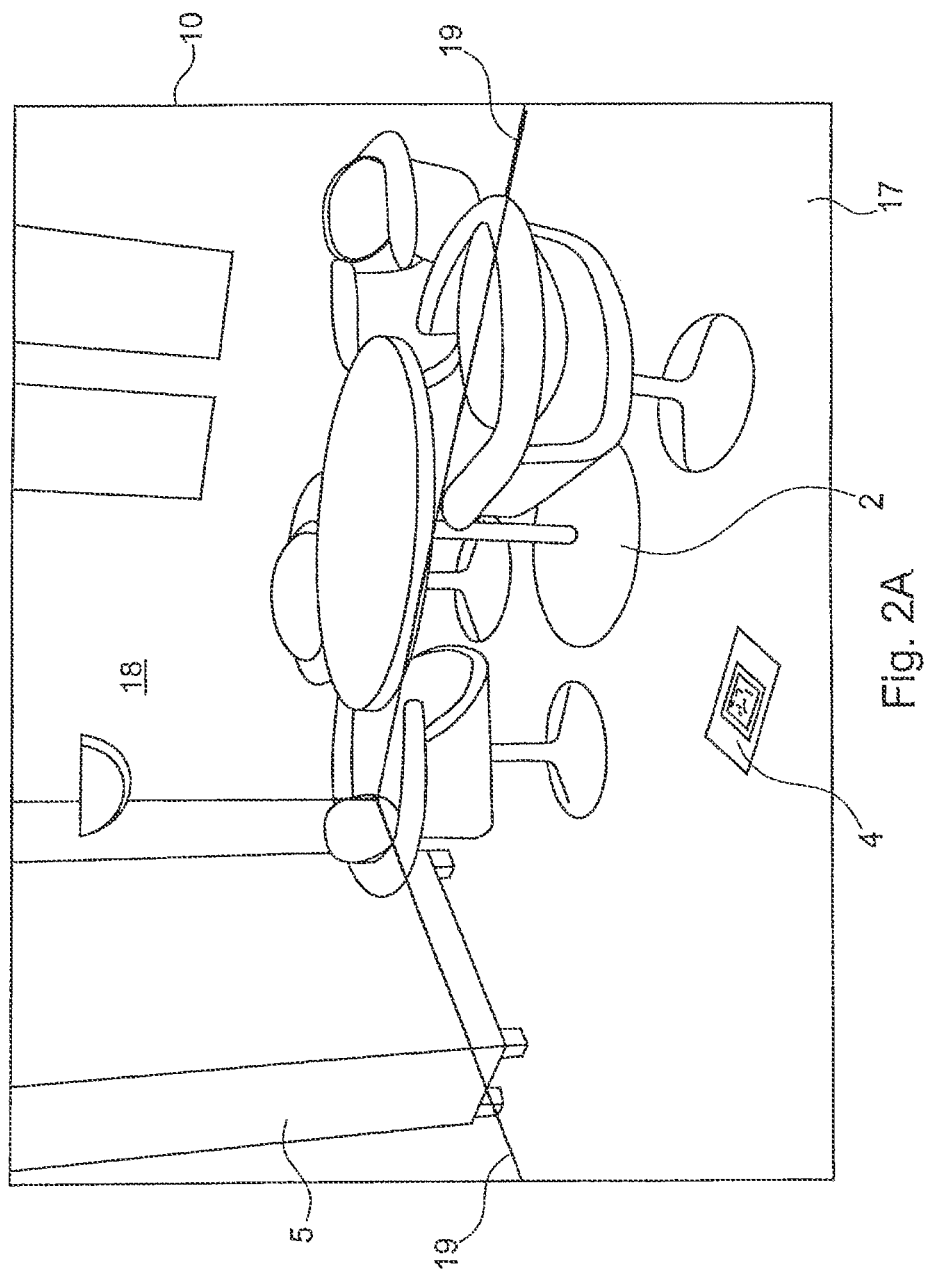
FIG. 2 shows, by an exemplary scenery, steps for segmenting a real space for a subsequent consideration upon merging with a virtual object.

A well-known problem of AR technology is that virtual objects, without special precautions, often occlude individual real objects in the view of reality. This is made clear by way of example in FIG. 1 by a scenery 1 in which the virtual object is a furnishing and the real environment is a usage environment. The virtual object is executed here in the form of a sofa 3 which is to be placed behind a real object, here a table 2. As further real objects there are present in FIG. 1 a cabinet 5, a floor 7 and a reference geometry 4 in the form of a marker on the floor 7.

In particular, there is applied for creating the sceneries in FIG. 1 and the subsequent FIGS. 2 to 8 in each case a method for representing a virtual furnishing in a real usage environment. In the present case a reference geometry is employed in the usage environment for obtaining position data. However, it is in principle also possible to apply other known methods for position determination e.g. of an employed recording camera, such as markerless tracking.

Explained by way of example with reference to FIG. 1, the usage environment 6 including the reference geometry 4 is optically recorded by a recording device not shown (for example a camera), and the recording is stored in the form of recording image data. The position of the recording device with regard to the reference geometry 4 is ascertained using known image processing algorithms, whereby the image data of the virtually existing furnishing (here sofa 3) and the recording image data are joined together in correct perspective. The usage environment 6 is then displayed to the user with the sofa 3 inserted in correct perspective. Advantages of the described system and method consist in particular in the joint perception of real and virtual objects in the usage environment. This leads to an intuitive assessment of the suitability of various products for a purpose of use. Furthermore, it is very easy to ascertain the geometrical suitability of a product at a place of use. Further, the suitability of a product for a purpose of use, e.g. the suitability of a furniture piece, can be determined without previous delivery. Any collisions of the products with other objects can be quickly discovered by the user.

As can be seen in FIG. 1, at least part of the virtual sofa 3 should be represented as being concealed by the table 2 in the merged view or representation of the scenery 1. With conventional AR technology, however, it is such that, without additional information, virtual objects are always displayed in the foreground regardless of their spatial position, that is, when the sofa 3 is shifted to the place shown in FIG. 1 the table 2 would be at least partly occluded by the sofa 3. However, this disturbs realistic perception, because virtual objects that are disposed spatially behind real objects should be represented as being concealed thereby in order for the merged representation to appear close to reality. In other words, the table 2 can be viewed as a spurious object upon placement of the virtual sofa 3.

A further possibility upon placement of the sofa 3 is the change of the room (usage environment 6), for example to see how the sofa 3 would look in the room without the table 2 or to create free space when sofa 3 and table 2 collide in their position. An advantage of AR technology here is the viewing of objects in their real environment, for example the viewing of the virtual sofa 3 on an existing wooden floor 7 or in front of the existing cabinet 5. Hence, it is expedient to work not purely virtually, but to remove spurious real furniture pieces from the scene or to change their position in the room without having to clear them aside physically.

FIGS. 10 and 11 show in this connection in each case a schematic representation of an embodiment of an inventive system with a video see-through device or optical see-through device.

The apparatuses according to FIGS. 10 and 11 have a recording device 92 (e.g. a camera) for generating a two-dimensional image of the real environment 6, as well as a data processing system 93 which determines the position of the recording device 92 relative to the real environment. In FIGS. 10 and 11 there are shown the real table 2 and the virtual sofa 3 only schematically in cuboid shape. A display apparatus connected to the data processing system 93, in FIG. 10 a screen 94 and in FIG. 11 semitransparent data goggles 95, each before the eye of the user 91, represents the virtual object 3 merged with the real environment 6.

The display apparatus can also be a head-up display of a vehicle, whereby for example information is displayed to the driver before his eye by means of the windshield of the vehicle. Also, there can be employed as a recording device optionally a radar device, a scanner, a depth camera or the like in analogous fashion.

The innovation of the invention consists in solving the problem of removing spurious objects by employing image segments. For room planning, all single steps can basically be carried out manually or using a so-called wizard. A wizard attempts to extract information automatically and the user can confirm results, or improve them by stating further information. For example, a wizard can identify spurious objects and mark their contours. The user can then optionally improve the contours.

Summing up, a basic idea of the invention consists in combining sensor indications or sensor data with regard to the sensor position relative to the represented reality (e.g. of radar- or camera-based 3D reconstruction data) with 2D segmentation methods for removing spurious objects.

The invention can not only be employed for room planning, but also for other AR applications, for example an AR navigation system in a vehicle.

Hereinafter there shall be explained with reference to the flowchart according to FIGS. 9A and 9B an embodiment of the invention in connection with the exemplary scenery views or representations of FIGS. 1 to 8.

Basic Conditions:

Hereinafter the information available to the system will be explained.

Focal Length:

Focal length relates to the internal camera parameters of the camera which is employed for recording the real environment. The ascertainment of focal length can be effected by self-calibration. Alternatively it can be obtained from so-called EXIF data or a camera database. If the EXIF data are incomplete, for example only focal length in mm is stated but not chip size, it is also possible to obtain only the chip size from the database. Otherwise an average focal length of digital cameras can be assumed. Alternatively, focal length can be obtained from vanishing point information. Here, the user marks e.g. two straight lines that are parallel in reality. From the vanishing point it is possible to compute the focal length. The marked straight lines should be matched very precisely to the actual straight lines in the image by computer vision methods. Advantageously, focal length can also be calculated from a plurality of images, if a plurality of images are available.

Distortion:

Distortion of the camera image can be stated in the ideal case and the image can be digitally corrected or the values can be taken into consideration in each case upon computations. There can be stated for example known correction values according to Zhang or Luhmann. If no correction values are known, auto-calibration approaches can be effective. Alternatively, the user can "straighten" image elements that are curved in the image but straight in reality (parquet, wall/floor transition, etc.) interactively by changing parameters. For correcting distortion there can be employed in particular information of the user about straight lines such as room boundaries or straight lines from focal length determination.

Extrinsic Parameters:

For ascertaining the extrinsic camera parameters, that is, the position and orientation of the camera in space, different methods can be employed:

Marker tracking (square or a learned texture),

Manually "clicking" on an image if the scales are known (ceiling height, etc.),

Learning image features (manually or automatically) and their 3D position over a plurality of images and use for images in which no marker is visible any longer, as a special case of feature learning, using wall or floor information, or correcting 3D feature positions.

In the case of the embodiment of the invention wherein an optical, semitransparent element is employed for representing the virtual objects, there is additionally known the offset of the camera relative to the virtual camera which the eye and the semitransparent display span. It is to be assumed here that said offset is very small and is determined for example by optical see-through calibration methods known from the prior art. In the case of strictly 2D segments, the latter are transformed to the virtual camera using approximations known from the prior art. 3D objects that are virtual or obtained from reality can be correctly transformed.

Ideally, an optical see-through display is additionally equipped with a mechanism which can be switched completely non-transparent to light beams coming from outside, ideally per displayable pixel.

Image Pre-Processing:

Advantageously, the image data which are to be processed by the system can be edited in a first step.

Floor Plane:

In most (but not all) cases it can be assumed that an approximately planar floor plane exists on which the marker (if employed) lies planarly.

Process Description

Figure 9A:
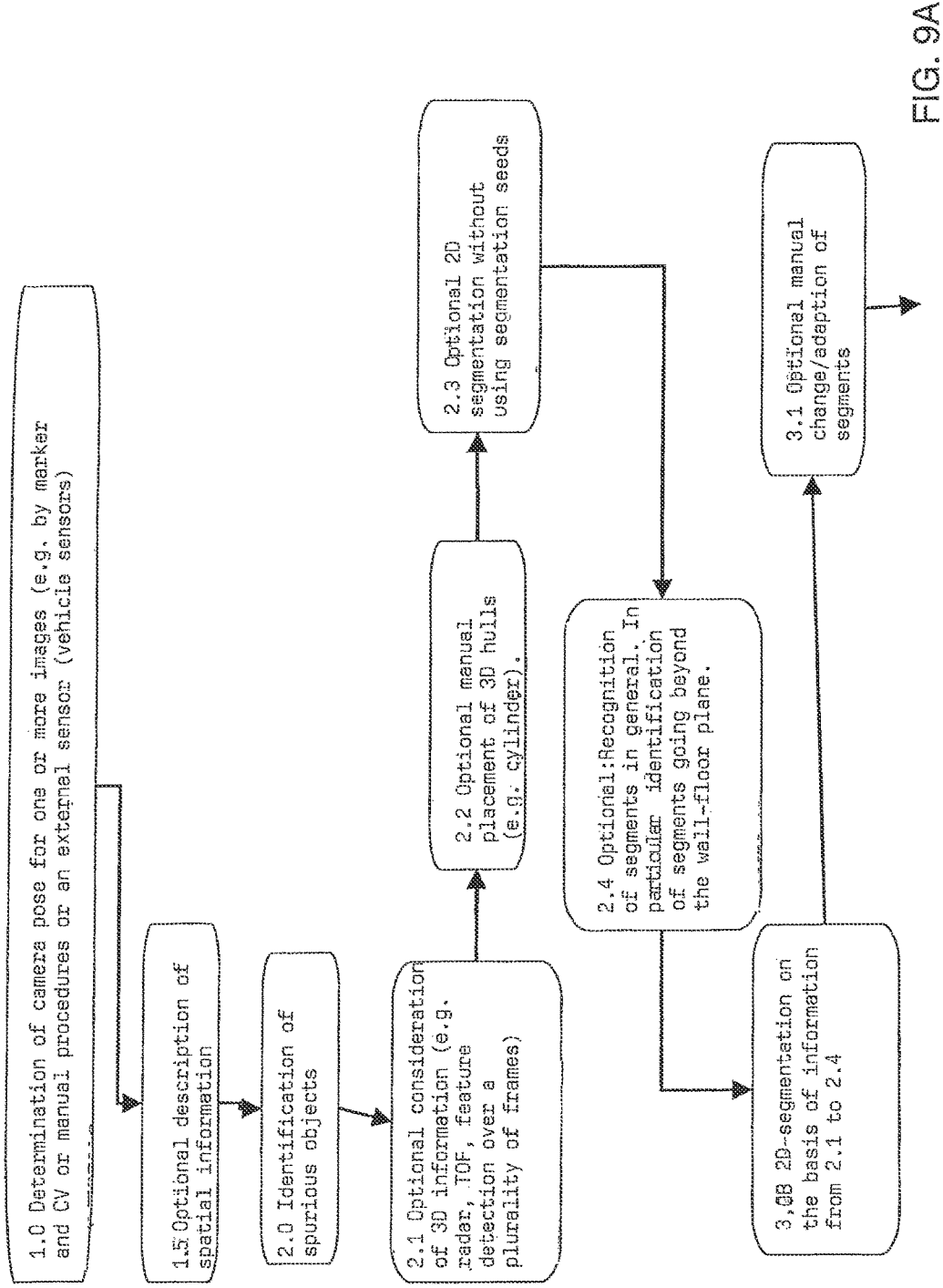
FIG. 9 shows a flowchart of an embodiment of an inventive method.
Figure 9B:
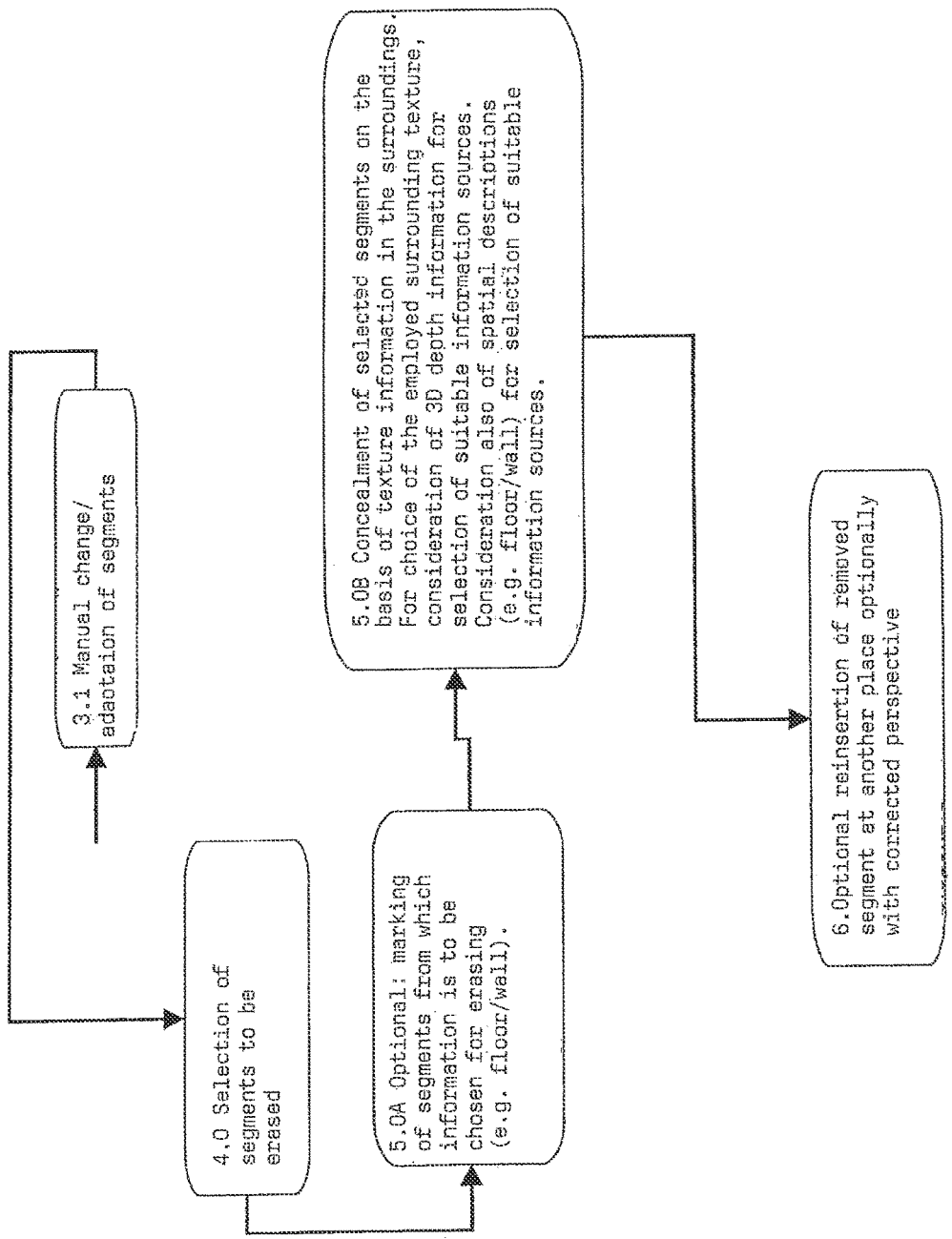

Step 1.0 According to FIG. 9A (Determination of Camera Pose for One or More Images, e.g. by Marker and Computer Vision or Manual Procedures or an External Sensor (e.g. Vehicle Sensors)):

In a first step 1.0 there is determined in every AR system the pose of the recording device (here the camera) in space. This can be ascertained by means of a marking located in the room (cf. marker 4 in FIGS. 1-8), or by means of an external sensor (e.g. mechanical tracking), by markerless tracking methods or by a simple manual process.

Step 1.5 (Optional Description of Spatial Information):

A helpful component of this invention in comparison to other methods is the consideration of the fact that, in the case of interior design planning, walls are often present in the image. It is assumed that the walls are approximately planar. It is further assumed that the walls are disposed orthogonally to the floor plane.

In a first step the user provides the system with information about walls in the image:

in the simplest case, walls or the floor plane can be described by polygons which are composed of individual corner points which the user marks in the image by the mouse.

walls can be defined by the user by dragging a coordinate system and placing it in the "corner". The length of the particular wall can be adjustable for special cases (freestanding wall). Otherwise the walls of the scene result from wall sections.

alternatively, the user can "drag" wall polygons to the individual corners. Advantageously, an image processing algorithm can readjust the arrangement of the wall plane by means of edge recognition. It is likewise possible to mark doors.

alternatively, there can be used automatic floor-wall plane extraction methods (wall wizard). A simple wizard could for example propose all straight edges in the image (for example by using the Hough transform).

Step 2.0 (Identification of Segments):

In room planning scenarios it is a matter of recognizing segments and ascertaining which represent the floor plane, the wall plane or other objects. In AR vehicle navigation it is of interest to recognize which segments represent the roadway, further vehicles or other objects. The individual substeps 2.1 to 2.4 deliver initialization information which enters into a 2D segmentation approach in step 3.0. The combination of automatic processing steps, like step 2.1, with manual steps, like step 2.2, is known as a so-called hybrid approach.

Step 2.1 (Consideration of 3D Information, e.g. Radar, Time of Flight (TOF), Feature Detection Over a Plurality of Frames (Image Data Sets)):

The later 2D segmentation is more effective when it makes a foreground/background differentiation per spurious object. To distinguish spurious objects out of the 3D data, cluster algorithms can be applied (see below on "Clustering"). Clustering means that no classes are initially known. The 3D information then serves as the initialization for a 2D segmentation, for example by means of graph cuts. Learning-based approaches:

There could be used learning-based approaches for 3D identification of spurious objects which are previously learned by the system from a set of examples. There could for example be created a database with different furniture pieces or primitives. It is helpful here to restrict the degrees of freedom, because the furniture can usually (except for shelves suspended on the wall) only be shifted on the floor plane. Perhaps this would be a way to automatically match at least simple furniture pieces, which are approximatable for example by 3D rectangles (state vector pos-x, pos-y, rot-z, x-size, y-size, z-size).

3D Features:

Feature matching (e.g. by SURF or SIFT or wide-angle feature descriptors) can advantageously ascertain over a plurality of images, in stereo cameras from one image, whether or not a point is located on the floor plane. If not, the 3D point can serve as a basis for so-called thresholding, or as a basis for other 2D segmentation methods. 3D points from feature matching can also enter into cluster algorithms regardless of information about the floor plane and then serve as a basis for 2D segmentation methods. Computation of the 3D position can be effected for example by triangulation or structure from motion methods or optical flow.

Objects as Spurious Factors in Premise Images:

For this approach there are required at least two images which both contain the same marker and the object to be removed. First an image is selected as a reference image. Based on the camera poses determined by means of the markers, the remaining images are so transformed that the plane in which the marker is located matches in all images. Subsequently the differential image is formed between the reference image and each transformed image. Because the marker planes match in all images, they are invisible in the respective differential images. It is thus possible to distinguish between floor (marker plane) and objects (visible in the reference image).

In this approach there occur, inter alia, the following problems:

if the floor (marker plane) is textured and the camera pose or the mapping between the images is not precisely determined, the total floor (or parts thereof) might possibly be marked as a spurious factor upon use of differential images based on the pixel-by-pixel grayscale value difference. The use of more complex differential measures, such as the difference of the local color/grayscale value histogram, seem to be more promising here.

if an object is monochrome (over a large area) it will become visible in the differential image only partly as a spurious factor, because parts of the object can also be mapped onto the object itself in the transformed image. However, it is nevertheless conceivable to employ this part as the initialization for a segmentation (e.g. by means of so-called graph cuts).

Sensors:

The invention is expedient not only for interior design planning, but for example also for AR in vehicles. Here it is possible for sensors, such as so-called time-of-flight cameras or radar, to deliver indications on real objects and their depth. However, the sensor information is usually much too noisy or too low-resolution for a visual representation. Hence, a later 2D segmentation step should follow in 3.0.

A Floor Plane with Surfaces Perpendicular Thereto:

On the condition that there is a floor plane and all other planes/surfaces are perpendicularly to said plane, there can be employed the method described in "Efficient Monocular 3D Reconstruction from Segments for Visual Navigation in Structured Environments" (P. E. Lopez-de-Teruel, A. Ruiz, L. Fernandez, 18th International Conference on Pattern Recognition, 2006, pp. 143-146).

In so doing, the edges in the image are first extracted and a representation of the locally existing colors on both sides of the edge is created (see "Real-Time Extraction of Colored Segments for Robot Visual Navigation" by Lopez-de-Teruel, Ruiz, Garcia-Mateos, Garcá, Book series: Lecture Notes in Computer Science, Springer Berlin/Heidelberg, Volume 2626/2003, Book: Computer Vision Systems: Third International Conference, Graz, Austria, Apr. 1-3, 2003, Proceedings). Employing this color information, the edges are subsequently assigned to common surfaces. On the basis of the restrictions made above, the position of the particular surfaces can now be computed.

It is of course also possible to use a combination of the described methods. Reconstructing (see "Google SketchUp"):

The furniture piece is reproduced by the user three-dimensionally and can be searched for in the image automatically by means of edge matching. A manual restriction of the search area by the user would presumably be advantageous.

Step 2.2 (Manual Placement of 3D Hulls (e.g. Cylinder)):

Optionally the user could mark spurious objects and mark the background. Then 3D information of any shape can be assigned to these classes. This is referred to as classification.

A "spurious object" which has been identified in an image by one of the methods can often also be identified in other images. It would now be helpful to find an assignment automatically:

which of the spurious objects did the user want to have removed in the scene, which did he not;

or which marginal cases have possibly been identified as spurious objects more clearly in another image;

or can accelerating initializations be recovered from other image information?

One approach for this purpose could be the roughly determinable position of the spurious object on the floor surface. Should a plurality of images be required for a semiautomatic process, the image selection can be facilitated for the user by means of the camera poses. Thus, the user could identify a spurious object in an image. The system could automatically display to the user (e.g. orthogonally to the first view) an additional image ideally suitable for the process.

Figure 4:
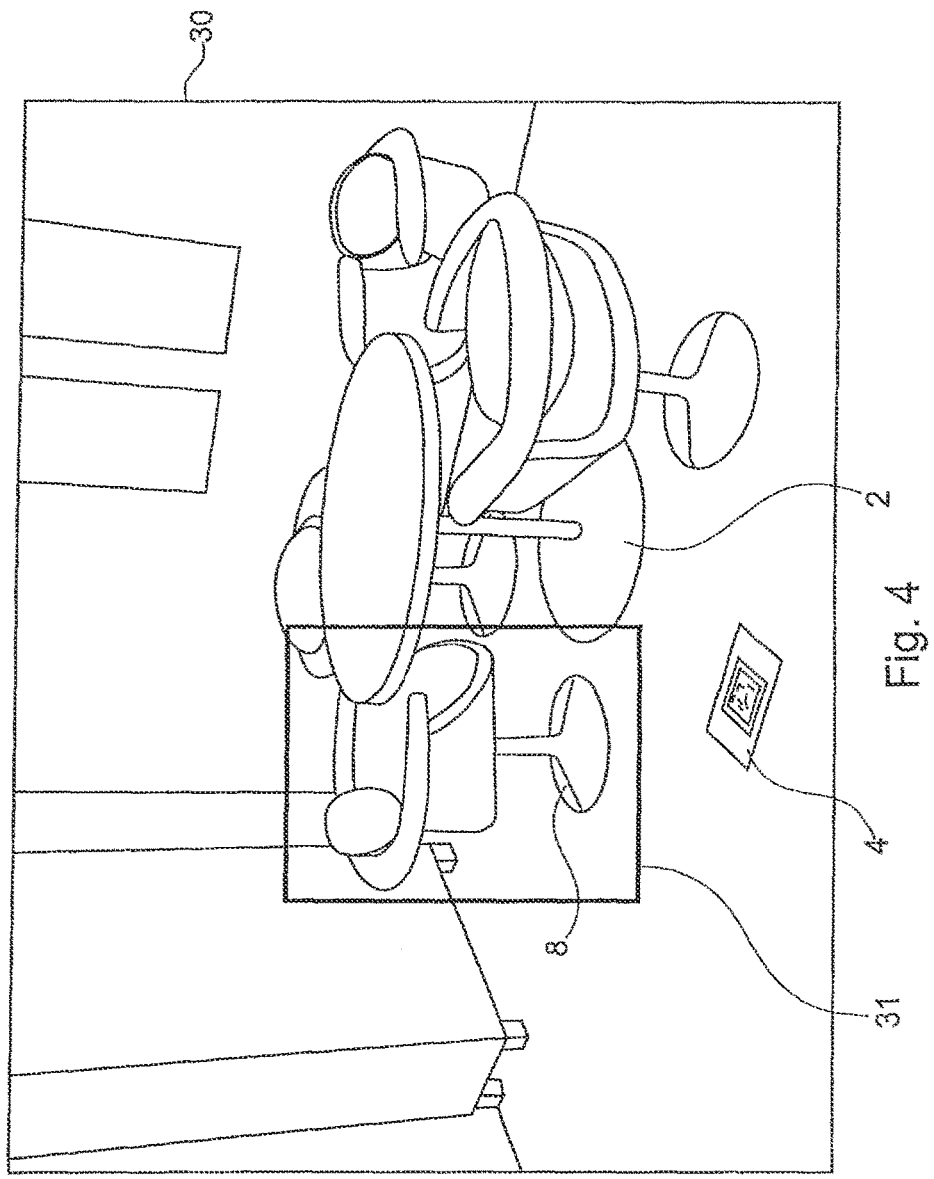
FIG. 4 shows, by an exemplary scenery, an exemplary step for manual or semi-manual segmentation of a real space for a subsequent consideration upon merging with a virtual object.

In FIG. 4 this is effected for example by means of a rectangle 31 which is disposed over a spurious object in the form of a chair 8 by the user in the representation 30. It is also possible to use other geometrical shapes in this connection, such as circular, elliptical shapes or shapes derived therefrom. The chair 8 is then segmented on the basis of this selection.

Figure 5:
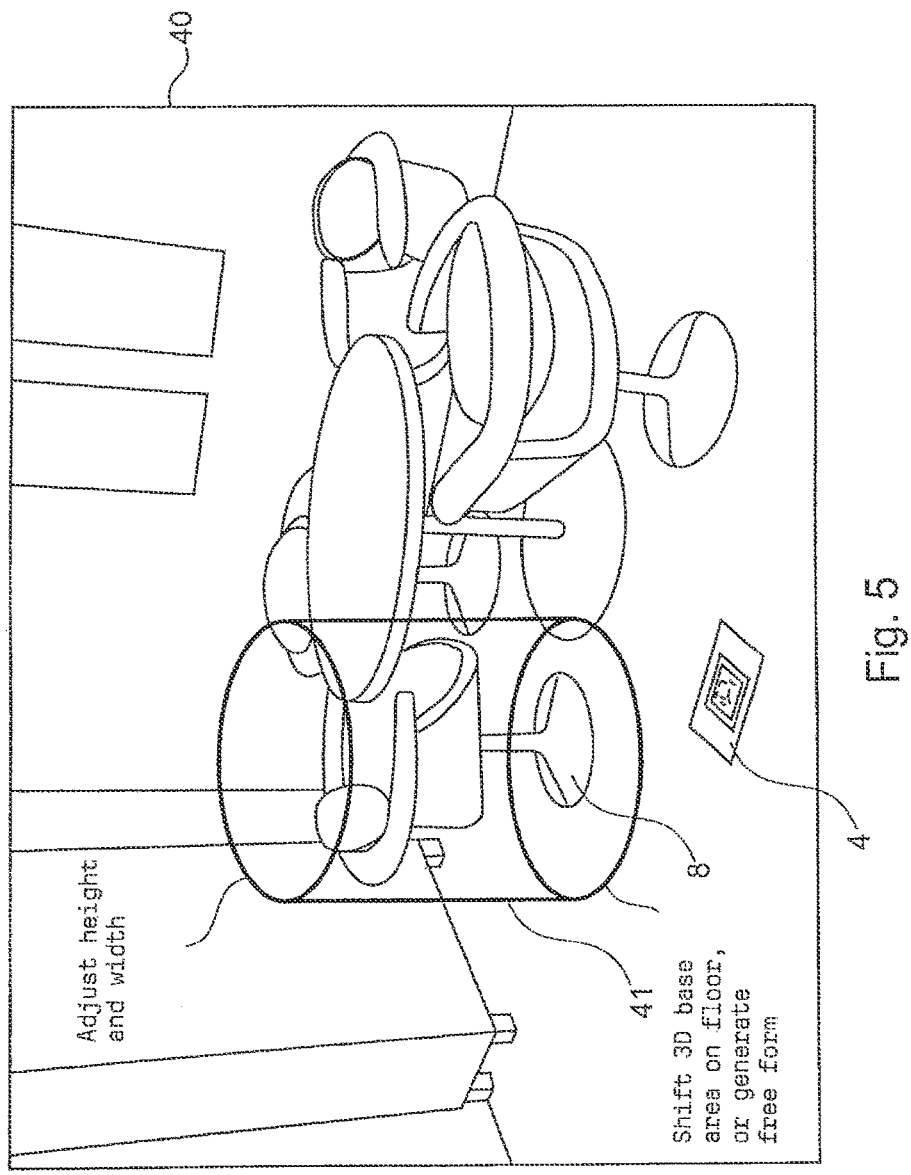

In FIG. 5 the segmentation is effected for example by means of a cylinder 41 which is disposed over a spurious object in the form of a chair 8 by the user in the representation 40. It is also possible to use other geometrical shapes in this connection, such as cuboid, elliptical hull shapes or shapes derived therefrom. The chair 8 is then segmented on the basis of this selection.

Figure 6:
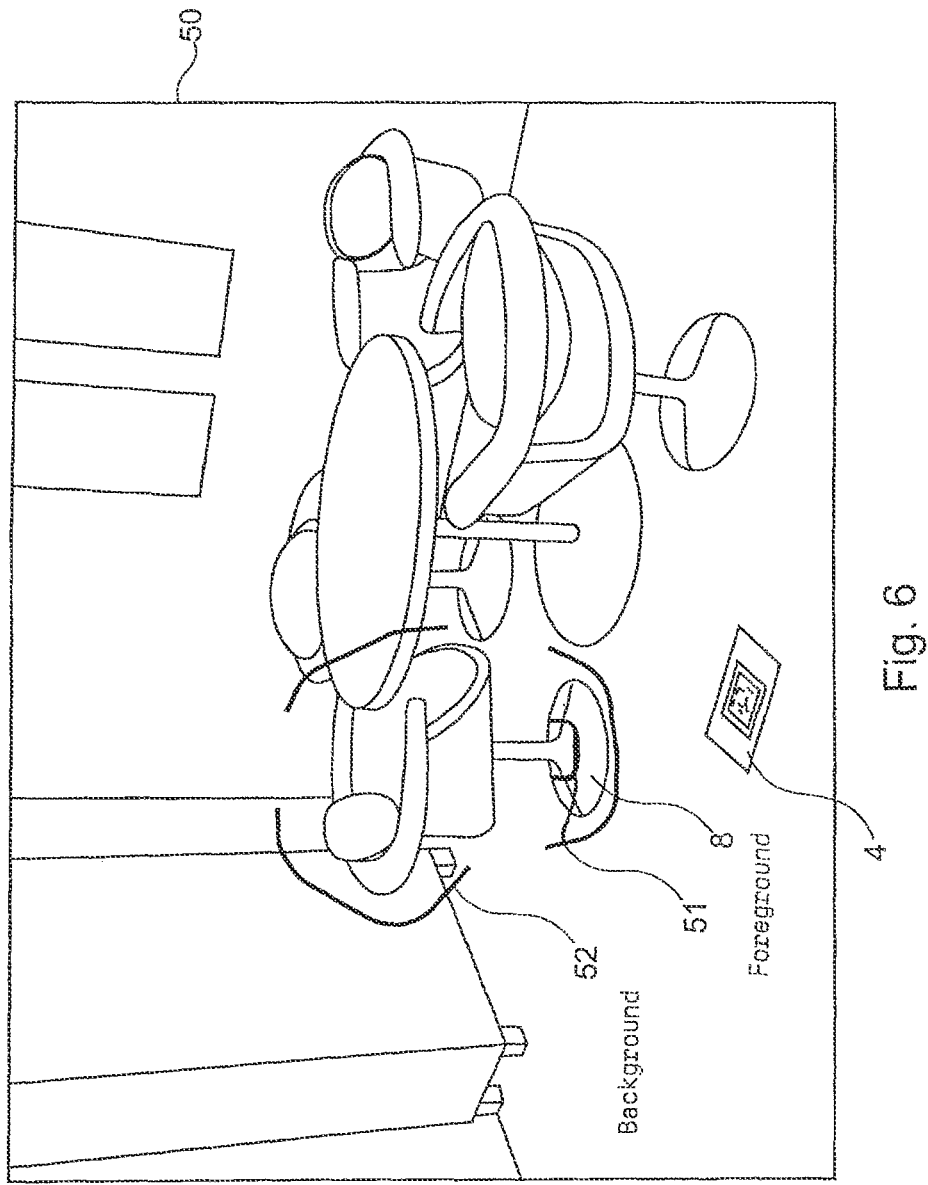

In FIG. 6 the chair 8 is segmented in the view 50 via foreground lines 51 for marking a foreground and via background lines 52 for marking background. The arrangement of the lines makes it recognizable to the data processing system which image components belong to the object in the form of the chair 8 (foreground) and can be segmented accordingly.

Figure 7:
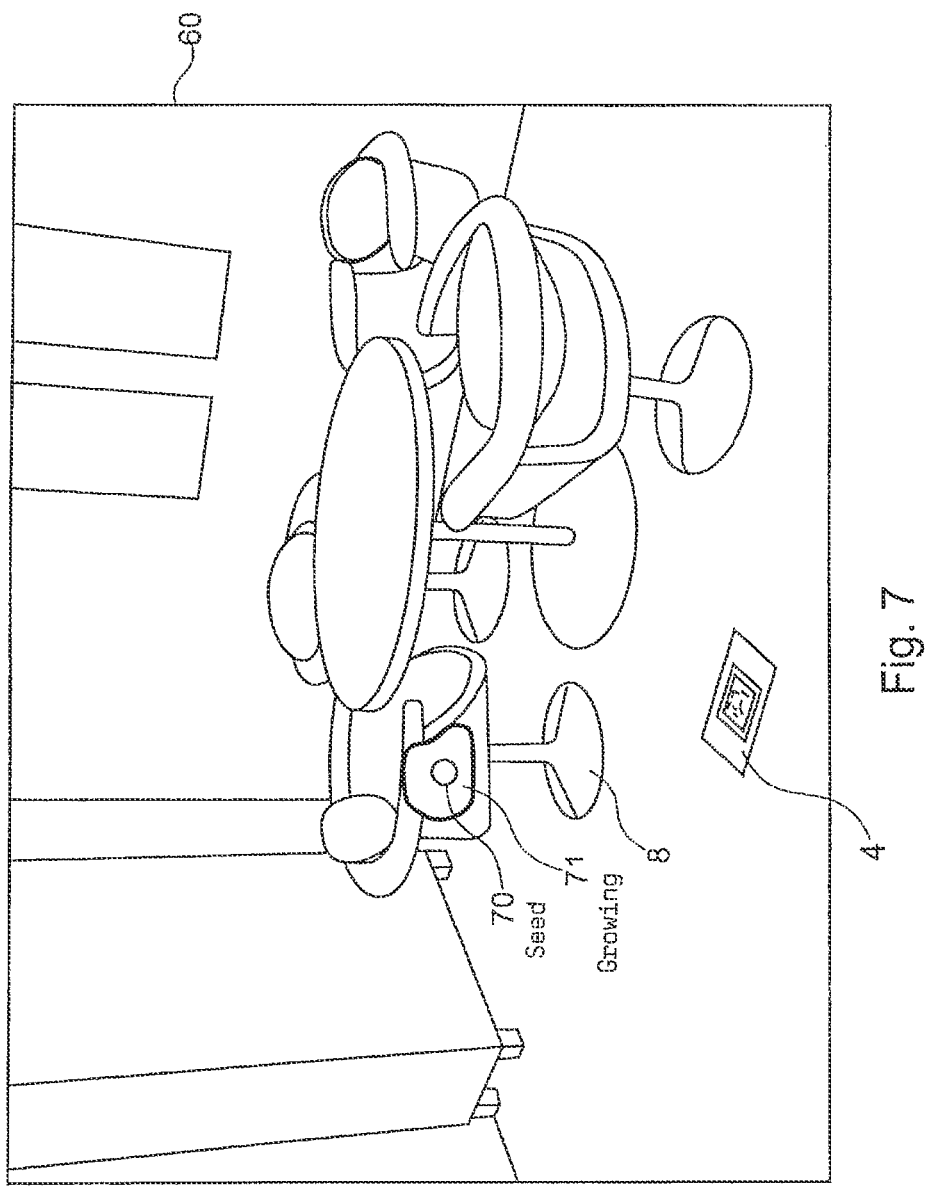

For this purpose there is shown in FIG. 7 an embodiment of a view 60 in which, starting out from a seed 70, there starts out a growing area 71 in order to segment the object in the form of the chair 8 (e.g. by "clicking" in the object 8 and so-called region growing, see below).

In FIG. 8 there is shown in a view 80 how a segmentation of the chair 8 can be performed manually by "painting in" an area 81.

Step 2.3 (2D Segmentation Automatically without Using Segmentation Seeds):

Basically it is also possible to carry out the process by an automatic segmentation process without using additional information. This information can then be merged in 3.0 with the results from 2.1.

"Level Sets"

Segmentation is carried out by changing a function which describes the outline of the object.
(see "Fast Marching Methods and Level Set Methods for Propagating Interfaces.pdf", J. A. Sethian, von Karman Institute Lecture Series, Computational Fluid Mechanics, 1998) "Split and merge":

In "region merging" the image is broken down into very small image areas (e.g. 2×2 pixels) and subsequently neighboring areas which are homogeneous to each other are joined together again. In "region splitting" the image is first viewed as a whole area and the latter is subsequently broken down step by step until each area is homogeneous. In "split and merge" the two approaches are combined, first the image is subdivided until all areas are homogeneous, subsequently neighboring areas are joined together again, providing this does not violate the homogeneity criterion.

"Watersheds":

The (grayscale value) image is interpreted as an elevation map with hills and basins. Water is now filled into this elevation map, so to speak, thereby forming different regions belonging together. For this "water filling" there are two different approaches which will be briefly presented hereinafter.

"Rainfall":

Place a raindrop on each unmarked pixel. Let the raindrop "flow" into a local minimum according to the slope of the color values. Mark each passed pixel with the label of the minimum.

"Flooding":

Start with the lowest color value (grayscale value) and increase the "water level" step by step. This causes the scenery to be slowly flooded. As soon as two basins start to join, erect a dam at the boundary between the two basins to prevent it. Thus a segmentation is finally obtained.

Step 2.4 (Recognition of Segments in General. In Particular Identification of Segments Going Beyond the Wall/Floor Plane) in Connection with FIGS. 2A and 2B:

Assuming a floor plane 17 with walls 18 in the scenery 10 according to FIG. 2A, and once these planes are identified, a wizard can identify all objects breaking through the boundary between floor and wall. For this purpose, a surface segmentation can either previously be carried out and the surfaces can be intersected with the straight lines 19. Alternatively, there can take place a gradient observation along the straight lines 19, and deviating minority units in combination with similar colors on both planes be employed as growing seeds for segmentations.

Figure 2B:
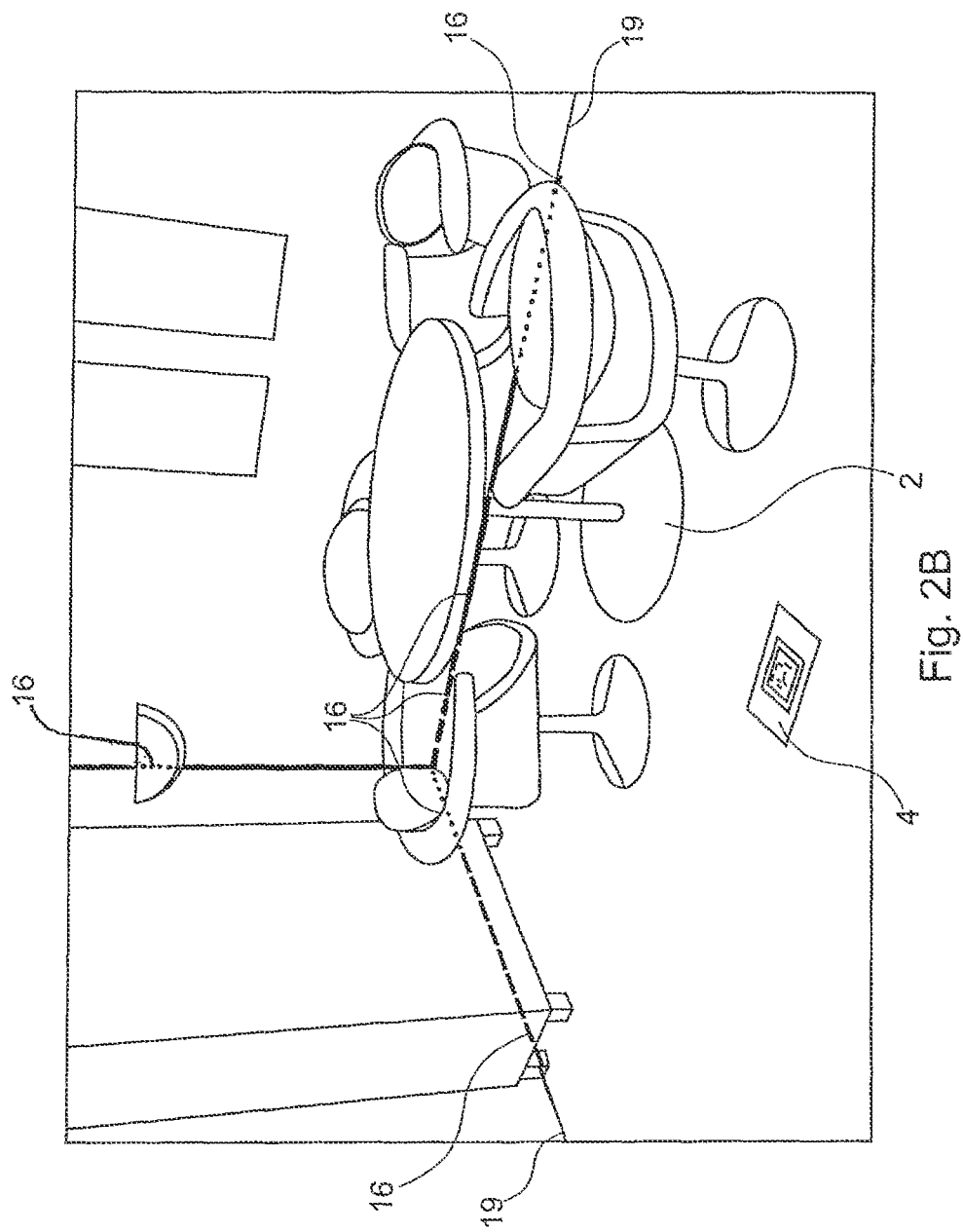

In FIG. 2B those places are marked with reference sign 16 where objects of the real environment intersect the straight lines 19, i.e. the transition between wall and floor planes. This is an indication that at this place there are objects which can be segmented for later erasure. These straight line portions can then for example enter into a graph-cut algorithm as the foreground.

Step 3.0 (2D Segmentation on the Basis of Information from 2.1, Optionally with Support of Steps 2.2 to 2.4):

For 2D segmentation it is possible to employ different approaches, whereby these approaches can advantageously be combined through approaches for extracting shadows in an image in order to rule out shadow segments as occluding segments. Furthermore, the approaches can also be applied several times per image when a plurality of spurious objects are expected in the image, for example coupled to the number of clusters.

"Graph Cuts":

From the image there is constructed a graph in which the nodes consist of the individual pixels, and two additional nodes are inserted for object and "non-object"/background. Each pixel is connected to its neighboring pixels (four-way neighborhood) and to the two additional nodes. It is now attempted to divide up the graph in such a way that the object node is connected only to pixels of the object, and the background node to the remaining pixels. As object pixels or background pixels, 3D information mapped into the image can now be assumed. Because there can be a plurality of spurious objects, the graph cut method can also be applied to an image several times. C. Rother, V. Kolmogorov and A. Blake, "Interactive Foreground Extraction Using Graph Cuts", ACM Transactions on Graphics, 2004

A. Blake, C. Rother, M. Brown, P. Perez, and P. Torr, "Interactive image segmentation using an adaptive GMMRF model", Proc. Eur. Conf. on Computer Vision, ECCV (2004)

"Snakes":

Segmentation using a deformable model. Three cost functions are minimized here:

internal energy: based only on the snake itself→normally in order to obtain a "smooth" course of the lines/of the model, external energy: based on the image values→normally dependent on the gradient (snake is attracted to edges), "balloon force": ensures that the model does not collapse (contract to a single point).

M. Kass, A. Witkin and D. Terzopoulos, "Snakes: Active Contour Models", International Journal of Computer Vision, pp. 321-331, 1987, Volume 1, Number 4 "Thresholding/Adaptive thresholding/Color thresholding":

Limiting values are defined for the image values. If a pixel possesses an image value within the defined range, it is assigned to the object, otherwise it is not. Determination of the limiting values can be effected automatically on the basis of the histogram or through user interaction (histogram or marking of an image region).

"Region Growing" (cf. FIG. 7):

A starting point in the image is chosen (automatically or manually) and starting out therefrom further pixels from its neighborhood are added to a queue if they fulfill a homogeneity criterion (within a threshold, etc.). Said queue is processed step by step, and the neighborhood of the current pixel viewed in each case. Pixels fulfilling the homogeneity criterion are added to the sought object.

"Live Wire/Live Lane/Adaptive Lane":

The image is regarded as an undirected graph, each pixel corresponding to a node. The user now provides a free form line (by mouse) from which a path with minimum costs is subsequently sought within the graph, which connects the two end points of the line. The costs of an edge are so chosen that edges are preferably chosen as the path. This corresponds to the live-wire approach, while in the live-lane/adaptive-lane approach the search area for looking for the path with minimum costs is restricted to the surroundings of the provided line. The size of the surroundings can be chosen e.g. in accordance with the speed of the mouse motion.

E. Mortensen, B. Morse, W. Barrett, J. Udupa, "Adaptive boundary detection using 'live-wire' two-dimensional dynamic programming", Proceedings of Computers in Cardiology, 1992

Hybrid Approaches:

Combinations of previous methods ("simple" approaches for initializing more complex methods).

Step 3.1 (Manual Change/Adaptation of Segments):

Should errors have occurred in the automatic or semi-automatic processes, they can be changed by simple manual interventions, such as drawing with the mouse. This is of course not possible or expedient in every application (e.g. in AR in vehicles).

There will now follow the different steps according to an embodiment of the invention with regard to "erasing the surroundings":

In FIG. 3 there is first shown in a schematic representation a step for three-dimensional segmentation initialization on the basis of image features 21. These are extracted from the image 20 by a corresponding detection algorithm.

Furthermore, if a floor plane can be assumed due to the application scenario, the depth with regard to the floor plane can be inferred on the basis of the position of the lowermost segment pixel on the floor plane.

Embodiment with Regard to Erasing the Surroundings, Shifting Existing Objects and Changing Colors/Textures:

One possible use of the invention is to change a room, for example in order to place virtual furnishings in said room for which free space is required. An advantage of AR technology is the viewing of objects in their real environment, for example the viewing of a wooden table on an existing wooden floor or in front of an existing cabinet. Hence, it is expedient to work not purely virtually, but to remove spurious real furniture pieces from the scene or to change their position in the room without having to clear them aside manually.

Step 4.0 (Selection of Segments to be Erased):

When spurious objects have been segmented, the user can select which are to be removed (for example by clicking in the corresponding segment). The information should be employed over a plurality of images if possible on the basis of the tracking information.

Step 5.0A (Marking of Segments from Which Information for Erasing is to be Chosen (e.g. Floor/Wall)):

The concealment of real objects is effected, to put it simply, by concealing with optical structures from the "neighborhood". In so doing, it is possible within the scope of this invention for additional information (for example, the spatial description) to increase the quality of the approaches.

The user should also be given the chance manually to give the algorithm indications from which area it should employ texture information for overwriting. For example, a wizard can show the user which image areas could be employed for texturing the whole or parts of the removed image area. The user can then select from these image areas. Also, the user could specify to the algorithm additionally edges to be considered upon texturing.

Step 5.0B (Occlusion of Selected Segments on the Basis of Texture Information in the Surroundings (Preferably Chosen). Consideration Also of 3D Depth Information for Selection of Suitable Information Sources. Consideration Also of Spatial Descriptions (e.g. Floor/Wall) for Selection of Suitable Information Sources):

When the spurious object to be removed has been selected by the user in a preceding step and its outline is known, a texture replacement of the object area is now carried out. The surface of the original image not covered by the object serves as a source for this purpose in order to fill the removed image area. To allow a replacement as realistic as possible, the following additional information can be employed:

2D edge information of the image can be used for allowing a realistic continuation of partly concealed object boundaries. The 2D edges are continued here according to their direction.

3D edge information can be used in order for intersections of object boundaries or of other edges to be correctly computed.

a subdivision/segmentation of the original image into single images which contain the texture of individual walls, of the floor or of other objects can be employed for a realistic texturing of the corresponding image areas by which they are concealed. For example, the wall should never be filled with floor textures. Likewise, the floor should not be filled with textures whose origin is at the position of other, known objects.

If a plurality of images are available, the system should remove the spurious object from all views automatically if possible. From the prior art there are known for example the following "inpainting" mechanisms which can be combined with steps 5.0A and 5.0B:

"Object Removal by Exemplar-Based Inpainting" by A. Criminisi, P. Perez, K. Toyama, June 2003, Madison, Wis., Proc. IEEE Computer Vision and Pattern Recognition "PatchWorks: Example-Based Region Tiling for Image Editing" by P. Pérez, M. Gangnet, A. Blake, Microsoft Research Report TR-2004-04 (2004) "Inference of Segmented Color and Texture Description by Tensor Voting" by Jiaya Jia, Chi-Keung Tang, IEEE Transactions on Pattern Analysis and Machine Intelligence, June 2004, Volume 26, Issue 6, pp. 771-786 "Image Inpainting" by M. Bertalmio, G. Sapiro, V. Caselles, C. Ballester, Proc. Of SIGGRAPH 2000, pp. 417-424, New Orleans, USA, July 2000

These are algorithms which utilize surroundings information and attempt to carry out the replacement as skillfully as possible. For example, some attempt to continue edges in the surroundings. The information from steps 5.0A and 5.0B can provide additional help here.

Step 6.0: Optional Reinsertion of Removed Segment at Another Place Optionally with Corrected Perspective.

Another advantage of this invention is not only the possibility of removing spurious objects, for example in interior design planning, but also of reinserting them at a new place. Thus, one could move a sofa, for example, a small distance aside to then insert a virtual cabinet into the scene. The segment can, if it is not rotated and only slightly translated, be inserted at a new place unchanged. Alternatively, there are different segment-based approaches for creating new views of the object from a plurality of existing object views. These include image-based visual hulls and space carving. Image-Based Photo Hulls, Gregory G. Slabaugh, Ronald W. Schafer, Mat C. Hans, Client and Media Systems Laboratory, HP Laboratories Palo Alto, HPL-2002-28, Feb. 4, 2002*.

International Journal of Computer Vision 38(3), 199-218, 2000, ° c. 2000 Kluwer Academic Publishers. Manufactured in The Netherlands. "A Theory of Shape by Space Carving", KIRIAKOS N. KUTULAKOS, Department of Computer Science and Department of Dermatology, University of Rochester, Rochester, N.Y. 14627, USA, kyros@cssochester.edu, STEVEN M. SEITZ, The Robotics Institute, Carnegie Mellon University, Pittsburgh.

Clustering:

"Shared Nearest Neighbor": "A New Shared Nearest Neighbor Clustering Algorithm and its Applications" by Levent Ertoz, Michael Steinbach, Vipin Kumar, Workshop on Clustering High Dimensional Data and its Applications at 2nd SIAM International Conference on Data Mining (2002). Employs as a similarity measure the number of shared nearest neighbors.

"AUTOCLUST":

"AUTOCLUST: Automatic Clustering via Boundary Extraction for Mining Massive Point-data Sets" by Vladimir Estivill-Castro, Ickjai Lee, in Proceedings of the 5th International Conference on Geocomputation, Callaghan 2308, Australia, 2000; "Effective and efficient boundary-based clustering for three-dimensional geoinformation studies" by Lee, I. and Estivill-Castro, V., The Proceedings of the Third International Symposium on Cooperative Database Systems for Advanced Applications, 2001, pp. 82-91, Beijing, China. AUTOCLUST employs the Delaunay diagram for the point set to be subdivided and removes edges with certain properties therefrom. The remaining edges divide up the data space into individual areas.

"GRAVIclust"

"Gravity Based Spatial Clustering" by M. Indulska, M. E. Orlowska, pp. 125-130, Proceedings of the Tenth ACM International Symposium on Advances in Geographic Information Systems, McLean, Va., USA, Nov. 8-9, 2002. In GRAVIclust, initial cluster centers are first computed and they are subsequently optimized by minimizing a corresponding cost function. The number of clusters must be previously known or can be ascertained iteratively.

Self-organizing maps (SOMs): "Self-Organizing Maps", T. Kohonen. Springer, Berlin, 1995. "Automatic formation of topological maps of patterns in a self-organizing system", T. Kohonen, in Proceedings of 2nd Scandinavian Conference on Image Analysis, Espoa, Finland, pp. 214-220. A self-organizing map is an n-dimensional array with m nodes. Each node in such a self-organizing map possesses a local vector which defines its position in the map, as well as a reference vector which corresponds to a point from the area of the data set. In training the map, there is determined in each learning step for each data point that node whose reference vector possesses the smallest distance therefrom. Subsequently the reference vectors of all nodes from the neighborhood of the winner node are modified.

SAHN (Sequential agglomerative hierarchical non-overlapping cluster analysis): "Efficient algorithms for agglomerative hierarchical clustering methods", William H E Day and Herbert Edelsbrunner, Journal of Classification, Volume 1, pp. 1-24, 1984. At the onset of the algorithm it is assumed that each point of the data set represents an individual cluster. In each step there is determined that pair of clusters having the smallest distance therebetween. These two clusters are then merged into a single cluster. For terminating the algorithm the number of existing clusters must be known or be iteratively ascertained.

DBSCAN (Density-based spatial clustering of applications with noise): "Density-based clustering in spatial databases: The algorithm GDBSCAN and its applications", J. Sander, M. Ester, H.-P. Kriegel, X. Xu. Data Mining and Knowledge Discovery, Volume 2, Number 2, June 1998, pp. 169-194 (26); "A distribution-based clustering algorithm for mining in large spatial databases", X. Xu, M. Ester, H.-P. Kriegel, J. Sander, 14th Int. Conf. on Data Engineering (ICDE'98), Orlando, Fla., USA, 1998. Variant of the SAHN algorithm in which density estimators, rather than a distance measure, are employed for merging clusters.

SDHN (Sequential divisive hierarchical non-overlapping cluster analysis): At the onset of the algorithm all points are located in the same cluster. Step by step the existing clusters are now subdivided. For terminating the algorithm either the number of existing clusters must be known, or an analysis must be carried out of whether a further subdivision of a cluster is expedient (e.g. by means of the Hopkins index). Alternating optimization of cluster models (Alternating cluster estimation, ACE): "Alternating cluster estimation: a new tool for clustering and function approximation" by T. A. Runkler, J. C. Bezdek, IEEE Transactions on Fuzzy Systems, Vol. 7, Issue 4, August 1999, pp. 377-393. The cluster centers and the partition matrices are alternatingly optimized here. Possible cluster models here are: c-means (CM model) or Gustafson-Kessel (GK model).

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed herein as the best mode contemplated for carrying out this invention.

What is claimed is:

1. A method for representing a virtual object in a real environment, comprising:
    capturing, by a recorder, a real environment in two dimensions;

determining position information for the recorder relative to at least one component of the real environment;

obtaining three-dimensional depth information relating to the real environment based on the position information;

segmenting at least one area of the captured real environment to identify at least one segment of the real environment distinct from a remaining part of the real environment;

merging a virtual object with the real environment such that at least one part of a segmented area of the real environment is removed from the real environment;

using the three-dimensional information for an area of the real environment adjacent to the removed part of the real environment to select a texture source from which to identify texture information to conceal the removed part of the real environment, wherein the texture source is selected from a group consisting of a floor plane and a wall plane;

identifying the texture information from the selected texture source; and concealing the removed part of the real environment using the identified texture information.

2. The method of claim 1, wherein the recorder is a camera.

3. The method of claim 1, wherein the captured real environment in two dimensions is an image.

4. The method of claim 1, wherein merging a virtual object with the real environment comprises merging the virtual object with an image of the real environment.

5. The method of claim 4, wherein the image is displayed on a screen.

6. The method of claim 1, wherein the merging of the virtual object with the real environment is expressed on a semitransparent display apparatus.

7. The method of claim 6, wherein the merging comprises use of an optical mixer.

8. A non-transitory computer readable medium comprising one or more instructions that when executed on a central processing unit (CPU) configure the CPU to:

capture a real environment in two dimensions by actuating a recorder;

determine position information for the recorder relative to at least one component of the real environment;

obtain three-dimensional depth information relating to the real environment based on the position information;

segment at least one area of the captured real environment to identify at least one segment of the real environment distinct from a remaining part of the real environment;

merge a virtual object with the real environment such that at least one part of a segmented area of the real environment is removed from the real environment;

use the three-dimensional information for an area of the real environment adjacent to the removed part of the real environment to select a texture source from which to identify texture information to conceal the removed part of the real environment, wherein the texture source is selected from a group consisting of a floor plane and a wall plane;

identify the texture information from the selected texture source; and conceal the removed part of the real environment with the identified texture information.

9. The non-transitory computer readable medium of claim 8, wherein the recorder is a camera.

10. The non-transitory computer readable medium of claim 8, wherein the captured real environment in two dimensions is an image.

11. The non-transitory computer readable medium of claim 8, wherein the instructions that when executed on a CPU configure the CPU to merge a virtual object with the real environment comprise instructions that when executed on the CPU configure the CPU to merge the virtual object with an image of the real environment.

12. The non-transitory computer readable medium of claim 8, wherein the instructions that when executed on a CPU configure the CPU to merge a virtual object with the real environment comprise instructions that when executed on the CPU configure the CPU to use an optical, semitransparent element, to merge the virtual object with reality.

13. The non-transitory computer readable medium of claim 11, wherein the image is displayed on a screen.

14. The non-transitory computer readable medium of claim 8, wherein a merged expression of the virtual object with the real environment is expressed on a semitransparent display apparatus.

15. The non-transitory computer readable medium of claim 14, wherein the instructions that when executed on a CPU configure the CPU to merge comprise instructions that when executed on the CPU configure the CPU to use an optical mixer.

16. A system comprising:

a memory configured to store instructions;

a recorder operatively coupled to the memory;

a computer processor operatively coupled to the memory and the recorder, the computer processor configured to execute the instructions stored in the memory so as to cause the system to:

capture a real environment in two dimensions by actuating the recorder;

determine position information for the recorder relative to at least one component of the real environment;

obtain three-dimensional depth information relating to the real environment based on the position information;

segment at least one area of the captured real environment to identify at least one segment of the real environment distinct from a remaining part of the real environment;

merge a virtual object with the real environment such that at least one part of a segmented area of the real environment is removed from the real environment;

use the three-dimensional information for an area of the real environment adjacent to the removed part of the real environment to select a texture source from which to identify texture information to conceal the removed part of the real environment, wherein the texture source is selected from a group consisting of a floor plane and a wall plane;

identify the texture information from the selected texture source; and conceal the removed part of the real environment with the identified texture information.

17. The system of claim 16, wherein the computer processor being configured to execute the instructions stored in the memory so as to cause the system to merge a virtual object with the real environment comprises the computer processor being configured to execute the instructions stored in the memory so as to cause the system to merge the virtual object with an image of the real environment.

18. The system of claim 16, wherein the computer processor being configured to execute the instructions stored in the memory so as to cause the system to merge a virtual object with the real environment comprises the computer processor being configured to execute the instructions stored in the memory so as to cause the system to use an optical, semitransparent element, to merge the virtual object with reality.

19. The system of claim 18, wherein the image is expressed on a screen.

20. The system of claim 16, wherein a merged expression of the virtual object with the real environment is expressed on a semitransparent display apparatus.

* * * * *